(12) United States Patent
Gould et al.

(10) Patent No.: US 8,374,790 B2
(45) Date of Patent: Feb. 12, 2013

(54) METHOD AND APPARATUS FOR GUIDING A VEHICLE

(75) Inventors: Richard D. Gould, Glen Ellyn, IL (US);
Doug Roberts, Bozeman, MT (US);
Justin Whisinhunt, Bozeman, MT (US);
Grant J. Nelson, Bozeman, MT (US)

(73) Assignee: Teejet Technologies Illinois, LLC, Springfield, IL (US)

( * ) Notice: Subject to any disclaimer, the term of this patent is extended or adjusted under 35 U.S.C. 154(b) by 507 days.

(21) Appl. No.: 12/609,662

(22) Filed: Oct. 30, 2009

(65) Prior Publication Data
US 2011/0106422 A1    May 5, 2011

(51) Int. Cl.
*G01C 21/34* (2006.01)
(52) U.S. Cl. .............. 701/533; 701/36; 701/50; 701/65; 701/412; 701/468; 340/901
(58) Field of Classification Search .......... 701/36, 701/50, 63, 65, 408, 412, 468, 469, 300; 172/4.5, 9; 340/901, 988, 438
See application file for complete search history.

(56) References Cited

U.S. PATENT DOCUMENTS

| | | | |
|---|---|---|---|
| 5,939,975 A * | 8/1999 | Tsuria et al. | ............. 340/426.18 |
| 6,199,000 B1 | 3/2001 | Keller | |
| 6,445,983 B1 | 9/2002 | Dickson | |
| 6,553,299 B1 | 4/2003 | Keller | |
| 6,813,557 B2 | 11/2004 | Schmidt | |
| 6,915,197 B2 | 7/2005 | Van der Lely | |
| 6,990,399 B2 | 1/2006 | Hrazdera | |
| 2003/0187560 A1 | 10/2003 | Keller | |
| 2010/0169010 A1* | 7/2010 | Jeong | ............. 701/209 |

FOREIGN PATENT DOCUMENTS

| | | |
|---|---|---|
| EP | 2 075 541 A1 | 7/2009 |
| JP | 09-304101 A | 11/1997 |
| JP | 2006-162442 A | 6/2006 |
| JP | 2007-101212 A | 4/2007 |
| WO | WO 2006/132522 A1 | 12/2006 |

OTHER PUBLICATIONS

International Search Report and Written Opinion, Teejet Technologies Illinois, LLC et al., PCT/US2010/048108, mailed Jul. 29, 2011.
JP 09-304101—English Abstract.
JP 2006-132522—English Abstract.
JP 2007-101212—English Abstract.

* cited by examiner

*Primary Examiner* — Gertrude Arthur Jeanglaude
(74) *Attorney, Agent, or Firm* — McKee, Voorhees & Sease, P.L.C.

(57) ABSTRACT

A device for aligning a vehicle with a next pass through a field comprises a camera which takes a corresponding natural picture. A receiver is provided for receiving a navigational signal from a navigational satellite system. A central processing unit is connected to the camera for receiving the natural picture and the receiver for receiving the natural satellite signal. The CPU generates a master signal comprising a video signal of the navigational picture, an actual indicator signal representing the actual position of the vehicle, and a desired indicator signal representing the desired position of the vehicle. A display is connected to the CPU for receiving the master signal and generating a master image comprising a natural picture image, an actual indicator image, and a desired indicator image. The vehicle is driven to cause an alignment of the actual indicator image with the desired indicator image.

17 Claims, 7 Drawing Sheets

METHOD AND APPARATUS FOR GUIDING A VEHICLE

BACKGROUND OF THE INVENTION

This invention pertains to a method and apparatus for guiding a vehicle and more particularly to a method and apparatus for guiding a vehicle along sequential paths through a work area.

Many off-road vehicles, especially farm vehicles, utilize GPS guidance systems. In a farm vehicle, such a system can help an operator guide the vehicle in consistent paths across a working area. Generally these systems utilize abstract virtual images to represent the working area. An actual position icon may be superimposed on the virtual working area image to represent the vehicle's position within the working area. A desired path indicator image may be superimposed on the working area virtual image to show the desired path for the vehicle. The relative positions of the actual position icon and the desired path indicator indicate whether the vehicle is on the correct path, and what adjustment needs to be made to move towards the desired path.

These abstract virtual displays can be useful and satisfactory for guiding an operator down a straight path, in order for the operator to remain on the desired path. However, because the virtual display does not visually correspond closely with what the operator is seeing in the real world, it can be very difficult for an operator to correlate the virtual display on the screen with what the operator is seeing outside of the vehicle. Therefore, when it is necessary to maneuver the vehicle around an obstacle, or to turn the vehicle back to make a next path along the previous path, it can be difficult for the operator to correctly position the vehicle.

BRIEF SUMMARY OF THE INVENTION

The present invention overcomes many of the disadvantages of present guidance systems by replacing the abstract virtual image with a live video image of the actual field or other environment of the vehicle, and by appropriately correlating the guidance lines or other images with this real world display. By displaying the desired path indicator on a live image of the actual field, an operator is able to correlate the image on the display screen with the real world, and is therefore better able to guide the vehicle in the desired path, especially for complex paths, and when turning to make a next pass through a field. In other words, the guidance images displayed on the screen are correlated to a proper perspective so that they appear over the live image to provide accurate and intuitive guidance to the operator. By seeing the guidance images superimposed over a live image of the actual environment in which the vehicle is located, an operator is better able to accurately guide the vehicle. The present invention is able to correlate live GPS data into a live video of the vehicle's environment, and place guidance images based on the GPS data that are correlated to the proper perspective for the live image.

Therefore, the present invention utilizes a display having a natural picture or a live image in combination with an actual indicator image and a desired indicator image. Alignment of the actual indicator image with the desired indicator image properly positions the vehicle for the next pass through a field.

An object of the present invention is an improved method and apparatus for aligning a farm vehicle with a next passage through a field.

A further object of the present invention is the provision of the actual indicator image and desired indicator image to be specifically correlated to and precisely displayed upon the natural image picture which provides a lifelike reference for proper alignment for next pass through a field.

A further object of the present invention is the provision of a master image design comprising a natural image picture, actual indicator image, and a desired indicator image. Driving a vehicle to cause alignment of the actual image with the desired image causes the vehicle to be aligned with the desired position.

A further object of the present invention is a blocking out of the area where the vehicle has gone and/or performed a field operation with a shaded image and the provision of a display which displays a natural picture and also displays an image representing the actual position of the vehicle and the desired position of the vehicle. Alignment of the actual image with the desired image results in a vehicle being properly aligned for its next pass through a field.

Yet another object of the present invention is providing a row indicator image within a live image to indicate a particular row that an operator should target for a next pass through a field of row crops.

The foregoing objects may be achieved by a device for guiding a vehicle through a field comprising a camera, or other imaging device, for generating a video signal corresponding to a natural picture. A receiver is also mounted on the device for receiving a navigation signal from a satellite navigation system. The navigation signal is used by the system to determine the present position of the farm vehicle and also where the vehicle has already gone. A central processing unit (CPU) is connected to the camera for receiving the natural picture signal and to the receiver for receiving the navigation signal. The CPU generates a master signal comprising a video signal of the natural picture, an actual indicator signal representing the actual position of the vehicle, and a desired indicator signal representing the desired position of the vehicle. A display is connected to the CPU for receiving the master signal and for generating a master image comprising a natural picture image, an actual indicator image, and a desired indicator image. Driving the vehicle to cause the alignment of the actual image with the desired image causes the vehicle to be aligned with the desired position.

The device includes a feature wherein the natural picture image is superimposed over the entire master image.

According to another feature of the present invention, the master signal generated by the CPU comprises an indicator signal representing a path which the vehicle should take on the next pass. The display generates a master image further comprising an indicator image representing the path which the vehicle will take on the next pass.

According to another feature of the present invention, the master signal generated by the CPU further comprises a shaded signal representing the area that has been worked, and the master image further comprises a shaded image representing area that has been worked.

The method of the present invention comprises taking a natural picture with a video camera. A navigational signal is received from a navigational satellite system, and the navigational signal is used to determine the present position of the vehicle and where the vehicle has gone already. The method comprises sending the natural picture and the navigational signal to a central processing unit. The CPU generates a master signal comprising a natural picture signal, an actual indicator signal representing the actual location of the vehicle, and a desired indicator signal representing the desired location of the vehicle. The master signal is transferred from the CPU to a display. The display displays the master signal as a master image comprising a natural picture image, a desired indicator image, and an actual image on the display. The vehicle then is driven to cause alignment of the actual indicator image with the desired indicator image, whereby the vehicle comes into alignment with the desired path of the vehicle.

Another feature of the present invention is the provision of correlating and aligning the location and placement of the actual indicator signal representing the actual location of the vehicle, and the desired indicator signal representing the desired location of the vehicle with the natural picture image. The display receives the master signal from the CPU and generates a master image comprising a natural picture image, a pair of indicators representing the next pass of the vehicle, and a desired indicator image. The image on the display is used to aid in the alignment of the vehicle with the desired path in the actual field.

DETAILED DESCRIPTION OF THE PREFERRED EMBODIMENT

Figure 1:
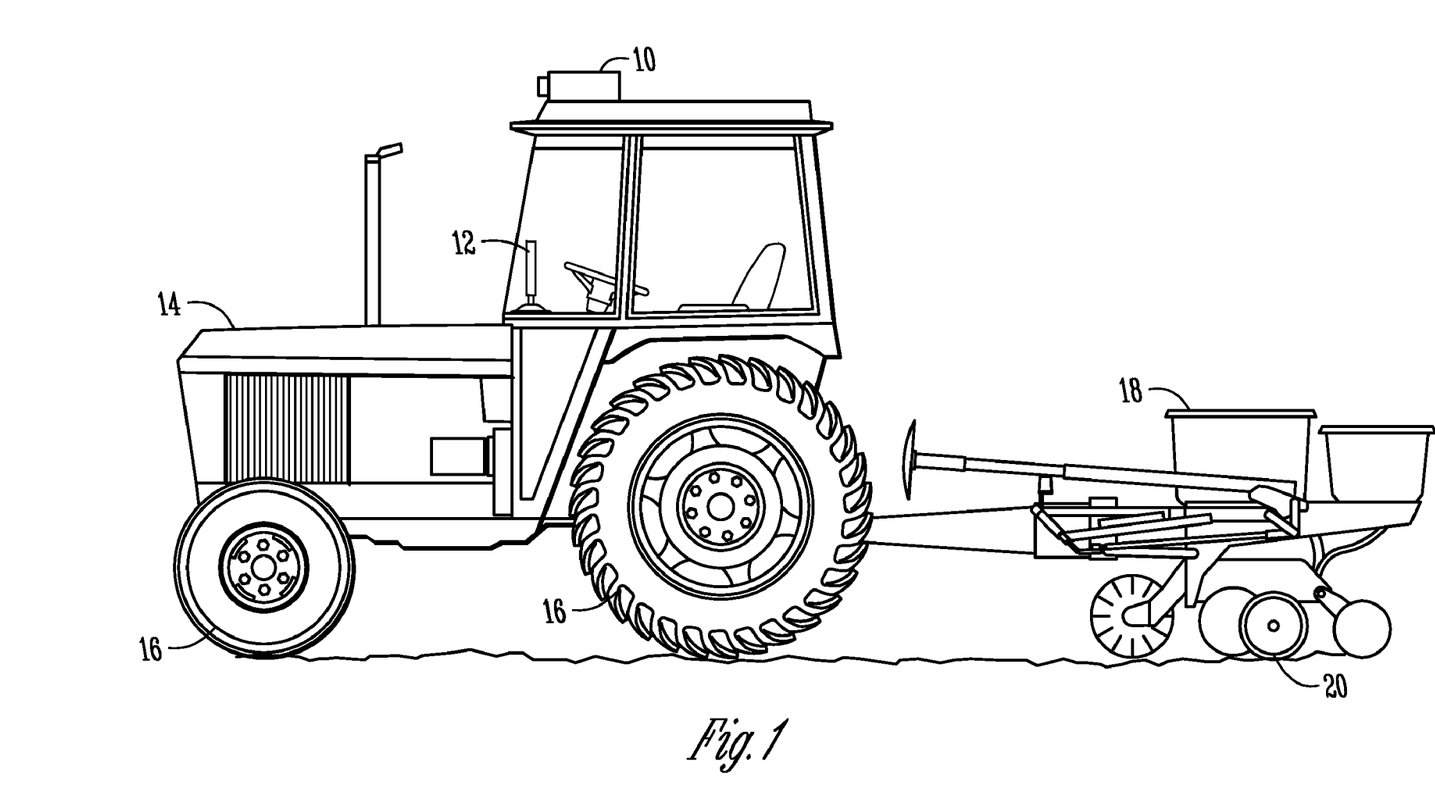
FIG. 1 is an elevation view of a vehicle which has a camera and display unit according to one embodiment of the present invention.

Referring to FIG. 1, a camera 10 is mounted on a vehicle 14 and is connected to display unit 12 that is provided at an available position for an operator. A plurality of tractor wheels (or tracks) 16 are mounted on the vehicle 14.

On the rear of the vehicle 14 is an implement 18 that is supported by wheels 20. Other implements, including self-supporting implements may be used. It should be appreciated that the implement 18 could be located in front of vehicle 14.

Figure 2:
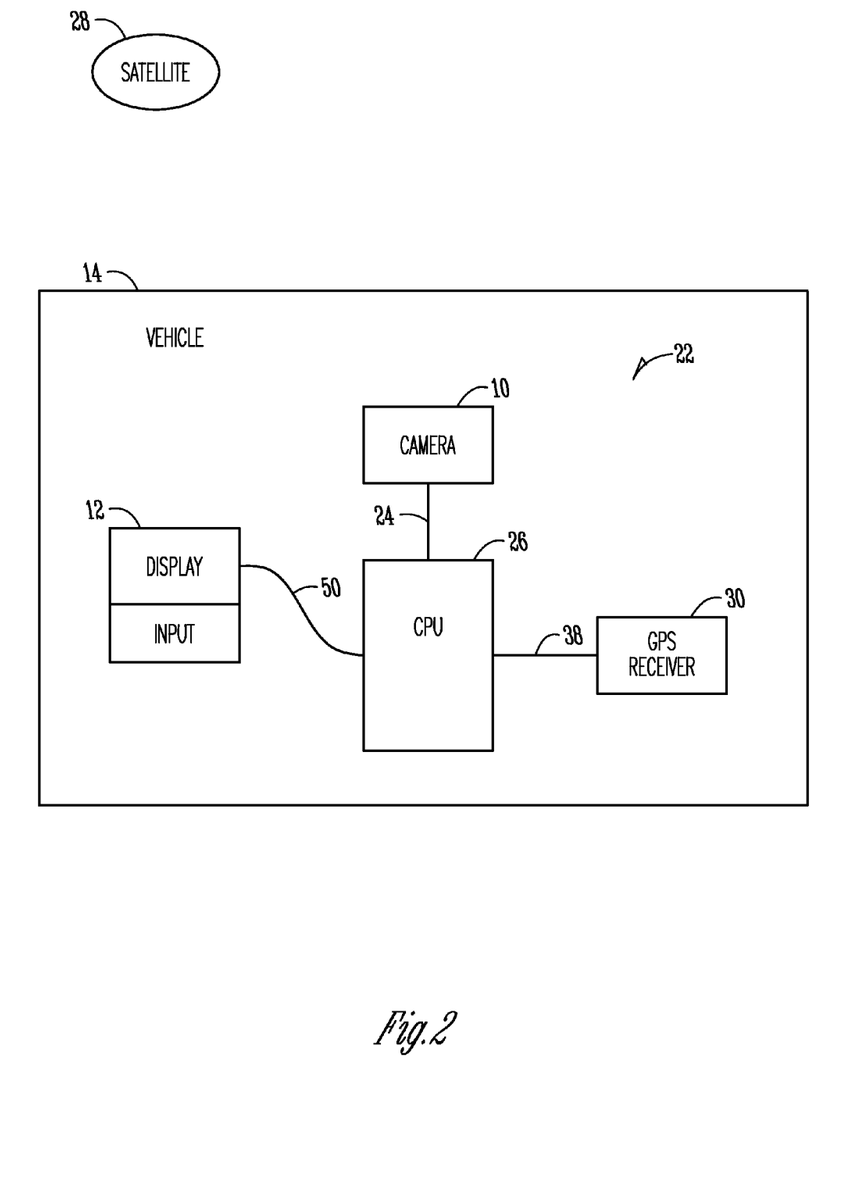
FIG. 2 is a block diagram showing various components of the invention.

Referring to FIG. 2, a device 22 is shown for aligning a vehicle with a next pass through a field. The device 22 includes a camera 10, a receiver 30, a central processing unit (CPU) 26, and a display unit 12. The camera 10 is preferably a digital imaging device. A line 24 connects the camera 10 to the central processing unit (CPU) 26.

A satellite navigation system is used by the CPU 26 to determine the present position of the vehicle 14. The CPU 26 also records this information to keep a record of previously worked locations. The receiver 30 receives the navigational signal from the satellite navigation system 28 and the CPU 26 determines the present position of the vehicle 14, and also where the vehicle 14 has formerly gone. The receiver 30 is connected by line 38 to the CPU 26. At the CPU 26, a master signal is generated, comprising a natural picture signal received from camera 10, an actual indicator signal representing the actual position of the vehicle 14 received from satellite navigation system 28, and a desired indicator signal 48 representing the desired position of the vehicle. The master signal is carried by line 50 from the CPU 26 to a display unit 12. It should be appreciated that the connection lines 24, 38 and 50 may be hand-wired connections, wireless connections, or other known connections that permit communication between the components.

Figure 3:
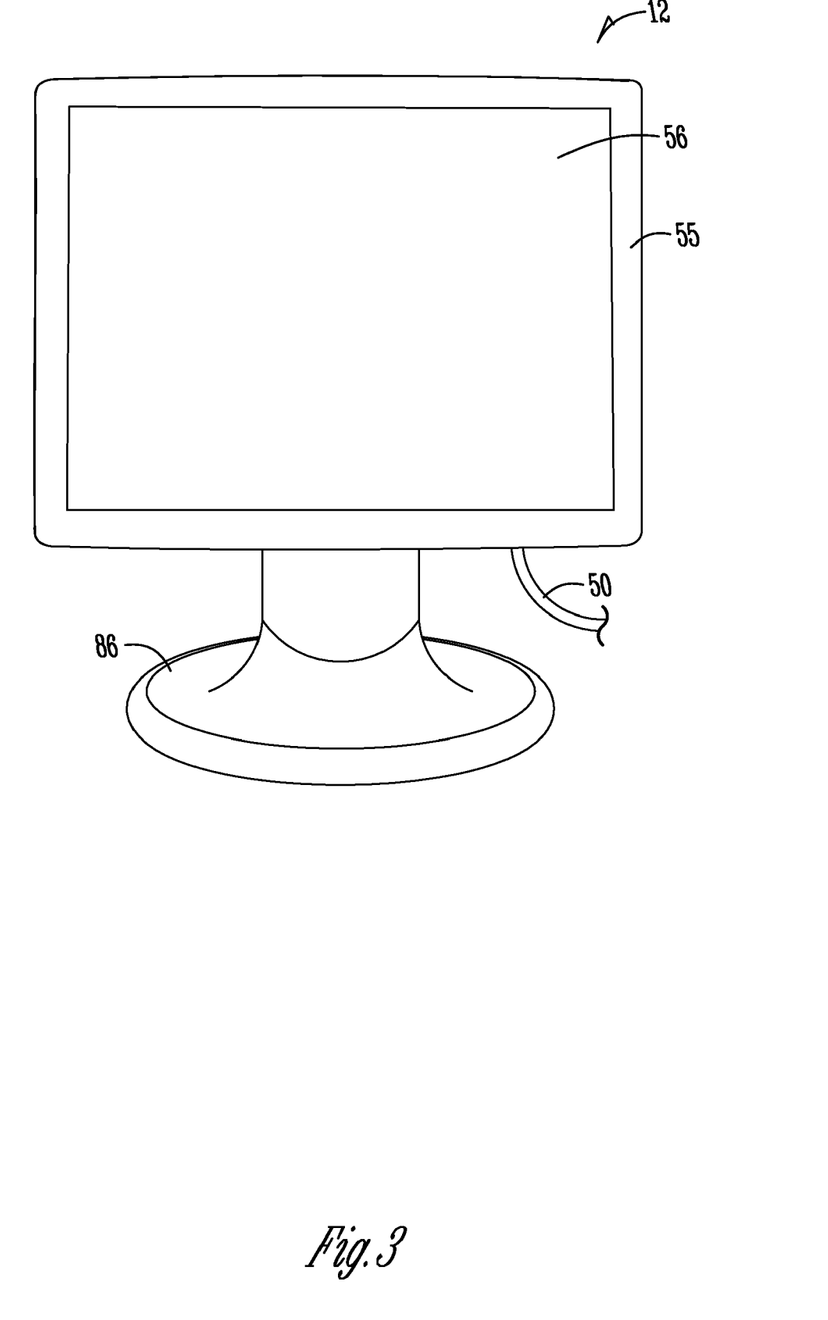
FIG. 3 is a perspective view of a display unit according to one embodiment of the present invention.

FIG. 3 shows a display unit 12 according to one embodiment of the invention. The display unit 12 includes a display monitor 55 swivel-mounted on a base 86. The base 86 may be provided with a suction mounting, may be weighted for stability, or may be otherwise adapted for mounting within the cab of a vehicle for heads-up viewing by an operator. The display monitor 55 preferably includes a touch-sensitive display screen 56 both for displaying images and information, and for receiving input from the operator. Alternatively, the display unit 12 may be provided with other input means such as dedicated buttons or a keyboard. The display unit 12 may have an internal power source such as a battery, or may receive power from an external source such as the vehicle's battery. The display unit 12 may include an input line 50 for receiving input from the CPU and/or the GPS receiver, or from an external power source. In the preferred embodiment, the CPU 26 and receiver 30 are provided within the display unit 12; however, the CPU 26 and receiver 30 may also be located externally from the display unit 12. Furthermore, the CPU 26 need not necessarily be a single unit, but could be two or more connected processing units.

FIGS. 4, 5, 6 and 7 depict screen shots of the screen 56 of the display unit 12 in various working states. The primary appearance of the screen 56 is that of a video monitor displaying the environment in front of the vehicle as captured by the camera. Various symbols, indicators, and icons are superimposed on top of this natural picture image of the actual field to act as navigation guides, to provide additional information to an operator, and to permit control of the device.

Figure 4:
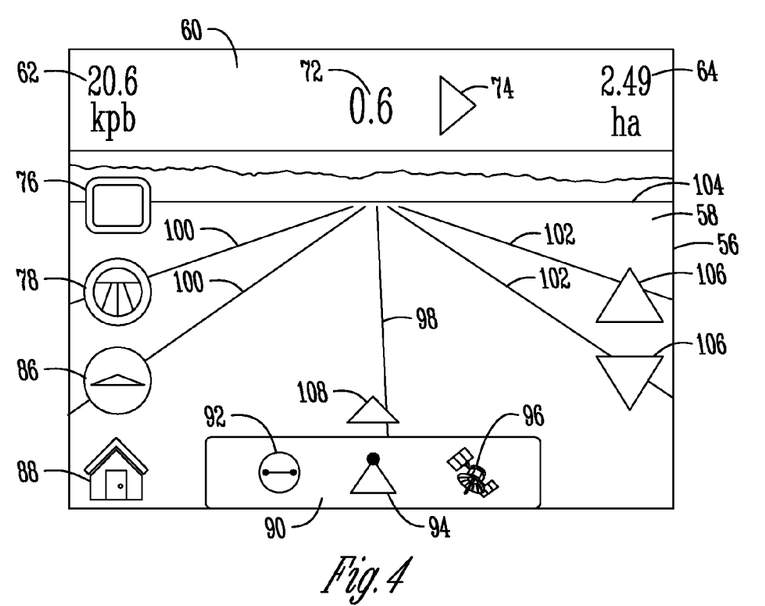
FIG. 4 is a display screen with indicator lines superimposed on a natural image to guide the vehicle on straight paths through a field.
Figure 5:
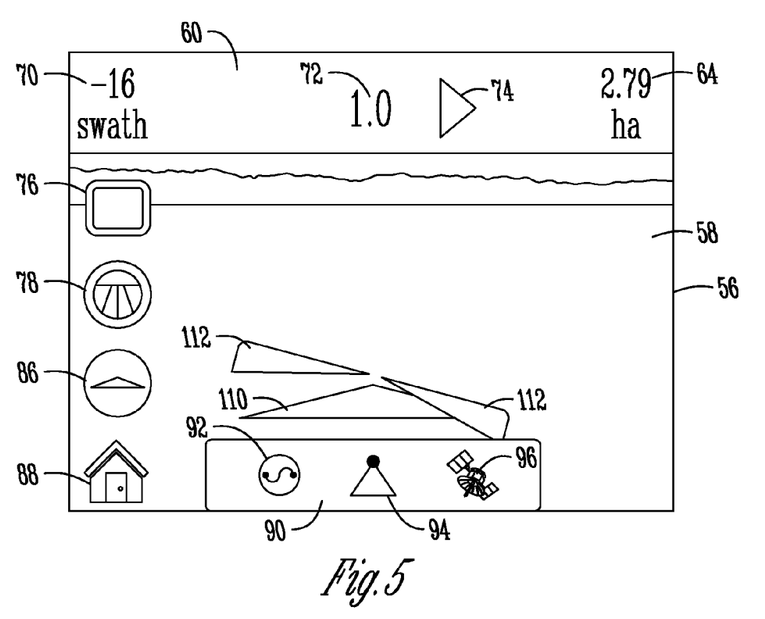
FIG. 5 is a display screen with an indicator graphic image superimposed on a natural image to guide the vehicle through a field along a desired path.
Figure 6:
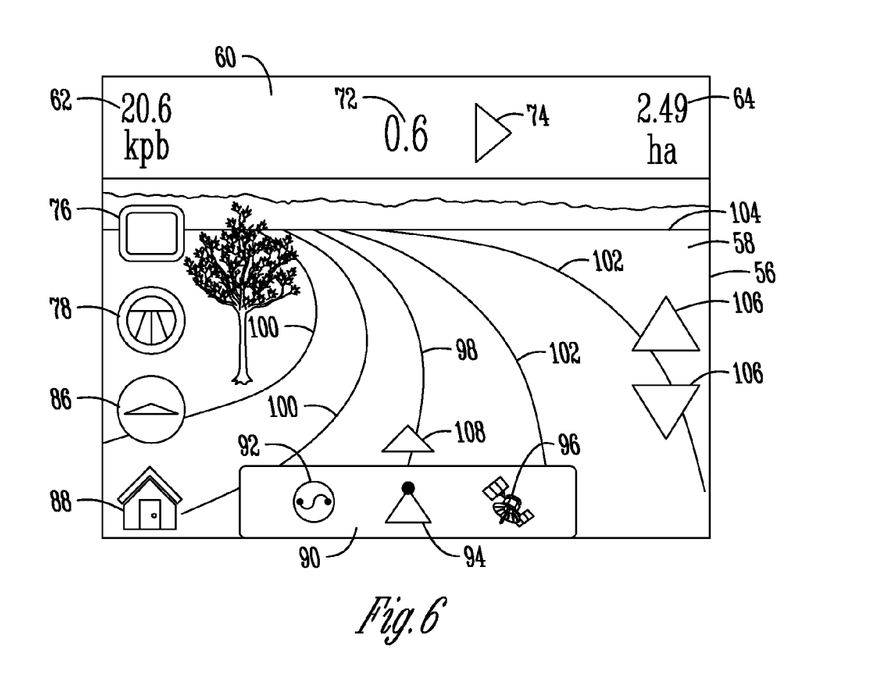
FIG. 6 is a display screen with curved indicator lines superimposed on a natural image to guide the vehicle along curved passes through a field.

For example, as seen in FIGS. 4, 5, and 6, in addition to the live picture image of the field, which acts as the primary background, each of the screens 56 is provided with an information banner 60 at the top of the screen. This information banner 60 serves as a background for the various information that can be provided within the banner 60. The information might include a speed indicator 62 as shown in FIG. 4. The speed may be displayed in any desired units, such as miles per hour or kilometers per hour. Other information that might be included in the information banner 60 includes a cumulative total of the total area worked 64, or an indication of which pass or swath through the field the vehicle is currently making 70 (see FIG. 5). An off target variance 72 may be displayed in combination with a direction indicator 74 to express how far and in what direction the vehicle has strayed from the desired path. For example, in FIG. 4 the operator would need to steer the vehicle 0.6 meters to the right in order to be on the desired path. Those of skill in the art will be aware that other units of measure may be used for the off target variance number. Those of skill in the art will also be aware of additional information that could be provided in the information banner 60.

With continued reference to FIG. 4, the touch screen 56 is provided with a menu of icons that can be used to control the display. For example, a screen icon 76 may be used to toggle the information banner 60 on and off. A path lines icon 78 is provided to toggle the various options for displaying the desired path and previous and subsequent paths. A caret icon 86 is provided to toggle between the various options for a caret 108 on the display screen 56 that indicates the center position of the vehicle within the real world image 58, including the possibility of toggling the caret completely off. A home screen icon 88 is also provided in order to toggle between the live image view used during working and a home screen control page. Those of skill in the art may be aware of other control icons to include on the touch screen 56.

A status bar 90 may be provided at the bottom of the touch screen 56. As shown in FIGS. 4, 5 and 6, the status bar 90 may include a guidance mode indicator 92 to indicate which type of paths are being used. For example, the paths may be straight lines as shown in FIG. 4, may be curved paths as shown in FIG. 6, or may be concentric paths. Other path modes will be known to those of ordinary skill in the art. A tool indicator 94 may be provided on the status bar 90 to indicate the status of the implement being used. For example, the status indicator 94 might represent the operational status of a planter, sprayer, disk, or other implement. A satellite status indicator 96 may also be provided on the status bar 90. The satellite status indicator 96 may be color coded to show whether a GPS signal is being received, or may be filled in or not filled in to various levels to indicate a strength of signal. Those of skill in the art will be aware of other indicators that might be included on a status bar.

Turning specifically to FIG. 4, a screen 56 is shown that has been toggled into a mode to use indicator lines to guide navigation of the vehicle. Specifically, it includes a current path line 98 that is preferably located centrally within the natural picture image 58. In this mode, the display screen 56 may also include previous pass indicator lines 100 and subsequent pass indicator lines 102. The current path line 98 should appear within the real world image 58 on the display screen 56 as passing across the ground within the image 58 along the path the vehicle should be guided. The previous pass indicator lines 100 should appear within the image 58 at the locations where the vehicle previously made passes. The subsequent pass indicator lines 102 should appear within the image 58 at the location where the vehicle should make its next paths or passes. The appearance of the lines 98, 100 and 102 should dynamically change as the vehicle moves through the field to correspond with the position of the vehicle relative to the pass indicator lines within the field.

The obliqueness of the previous and subsequent pass indicator lines 100 and 102 with respects to the current pass line 98 can be varied by adjusting a virtual horizon line 104. The up and down movement of the horizon line 104 can be accomplished by an operator touching the touch screen 56 at horizon line adjustment icons 106. This permits an operator to fine tune the perspective of the guidance lines 98, 100 and 102 to match the terrain and the mounting orientation of the camera 10 with the image produced by the camera. In order to accurately orient the guidance lines 98, 100 and 102 to accurately represent the three dimensional perspective within the two dimensional image, a calibration of the touch screen 56, as described in detail below with respect to FIGS. 8, 9 and 10, will be advantageous.

With continued reference to FIG. 4, a caret 108 is provided within the natural image 58 to indicate the actual location of the vehicle within the image 58. In use, an operator should steer the vehicle in order to align the top point of a caret 108 with the current pass line 98 in order to properly align the vehicle on the appropriate path. As noted above, in the example shown in FIG. 4, the operator would need to steer the vehicle to the right in order to bring the caret 108 in alignment with the current pass line 98 to properly position the vehicle.

FIG. 5 illustrates an alternative graphic that may be used to properly align the vehicle on the appropriate path through a field, rather than the lines used in FIG. 4. In FIG. 5, a large caret 110 is again used to represent the position of the vehicle within the live image 58. A steering indicator 112 is provided on the screen 56 to show graphically in which direction a user should turn the steering wheel in order to move the vehicle onto the desired path. For example, when the steering indicator 112 is tilted with the left side raised and the right side lowered, the operator should rotate the steering wheel in a clockwise direction in order to steer the vehicle back to the right into alignment with the proper path. As seen by the off target variance indicator 72 within the information banner 60, the vehicle in FIG. 5 is one meter to the left of the appropriate position and needs to be steered one meter to the right to be brought back into proper alignment. Those of ordinary skill in the art will be aware of numerous other guidance indicators that would be acceptable alternatives to the line and steering indicators discussed above. The important feature is that the indicators should show within the live image 58 the position of the vehicle relative to the desired path.

FIG. 6 shows a display screen 56 wherein the current pass line 98, previous pass lines 100 and subsequent pass indicator lines 102 are curved rather than straight.

Figure 7:
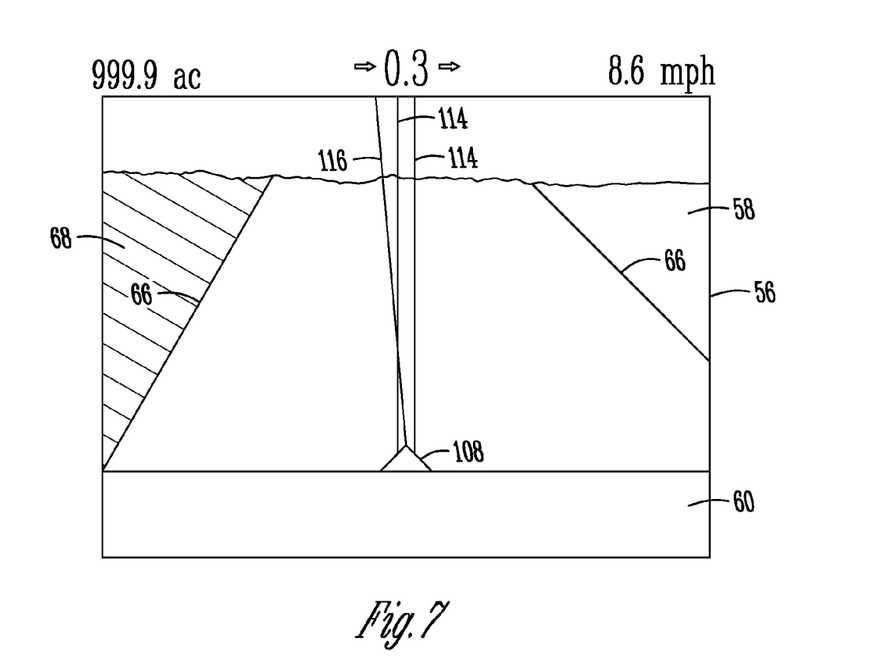
FIG. 7 is a display screen with a pair of indicator lines to show the desired path and an actual indicator line to show the actual path superimposed on a live image of the field.

FIG. 7 shows an alternative display screen 56 that includes an alternative guidance indicator mechanism. A caret 108 is provided within the natural image 58 to represent the actual location of the vehicle within the natural image 58. Extending from the caret is a pair of current pass line indicators 114 that serve to show the location of the desired path through the natural image 58. An actual path indicator 116 extends from the caret 108 to indicate the actual path the vehicle is currently taking. In order to properly align the vehicle on the current path, an operator should steer the vehicle so that the actual path indicator line 116 is centered between the parallel current pass lines 114.

Additionally, as shown in FIG. 7, this device maintains a record of the area that has been worked. This area appears as a shaded zone 68 to clearly indicate to the operator where he has gone before, and also to indicate where the areas that have not been worked are. The concept is to project this recorded worked area over a live video image to bring improved situational awareness to the operator and to allow him to see his work relative to real world features rather than an abstract virtual map.

Figure 8:
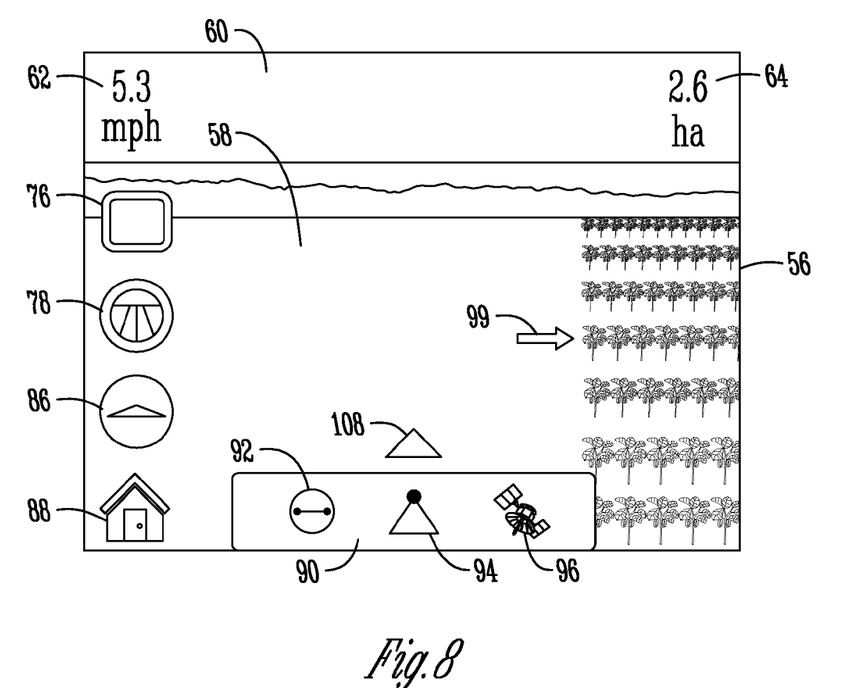
FIG. 8 is a display screen with a row indicator image within a live video image to show a desired row for a next pass through a field of row crops.

As shown in FIG. 8, one embodiment of the present invention includes the feature of providing a row indicator image 99 within the natural image 58. According to this feature, when an operator is making a turn after a pass through a field that has established rows of crops, the row indicator image 99 will provide an indicator of the particular row of crops the vehicle 14 should align itself with for the next pass. When operating at the head lands of a field outside the rows, it can be difficult to visually distinguish between rows that look more or less the same. By providing a visual indicator of the correct row within the natural image, the present invention permits an accurate start to each pass. The CPU makes the determination of where to place the row indicator image 99 within the natural image 59 based on the GPS data of the vehicle's current location, the record of the past vehicle path, and a known spacing for the crop rows. According to this embodiment the master signal sent by the CPU to the display screen includes a row indicator signal. It should be appreciated that the row indictor 99 could indicate a particular space or alley between two rows as an alternative to indicating a particular row of crops.

Figure 9:
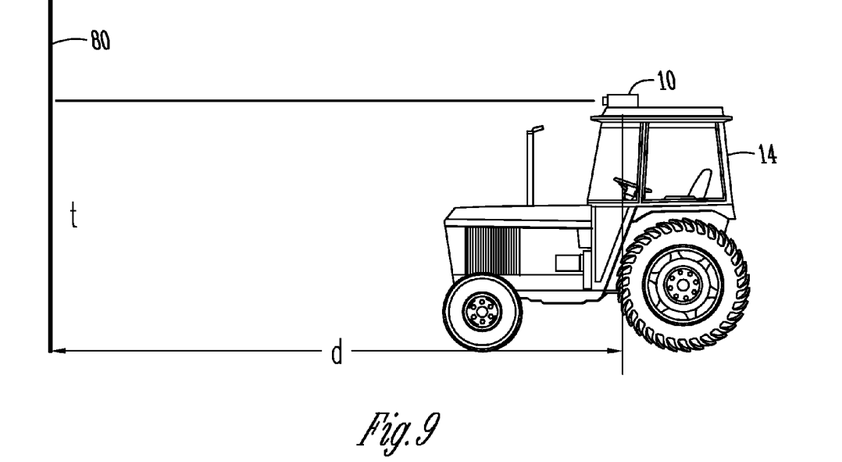
FIG. 9 shows a tractor and camera at a known distance and orientation with respect to a target wall for calibration.
Figure 10:
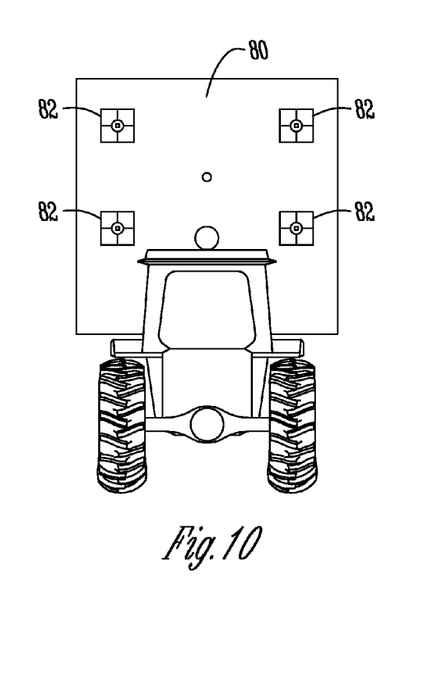
FIG. 10 is a side view of the tractor and target wall of FIG. 8.
Figure 11:
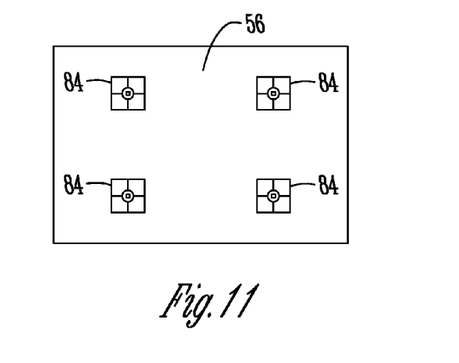
FIG. 11 is a touch screen display for use in calibrating the system.

According to another feature of the present invention shown in FIGS. 9, 10 and 11, the camera 10 is specifically aimed and calibrated so that the guidance indicators are correlated into the natural picture image and adjusted on the go to maintain the correlation between the natural image and the indicators. According to this embodiment, the camera 10 is mounted in a fixed position. The camera 10 is spatially calibrated using specific physical locations ahead of the vehicle 14. Once the calibration is completed, the CPU can process the natural image and mathematically determine where the indicator lines 60 and 62 need to display on the screen, and update the indicators continuously as the image changes. In this fashion, the natural image and indicators dynamically match up. This embodiment is especially well suited for situations where a farmer desires to be able to select the correct set of rows with which to align the machine for the next pass.

FIGS. 9 and 10 show the vehicle 14 positioned in front of a target wall 80 in order to calibrate the camera 10. As seen in FIG. 10, the target wall 80 has a plurality of targets 82 that are in a known pattern with respect to each other. In the preferred embodiment shown, four such targets 82 are used; however, those of skill in the art may be able to accomplish the same purpose with two or more such targets 82 arranged in a known pattern. The spacing and positioning of the targets 82 relative to each other should be measured so that it is known. The target wall 80 may be the exterior wall of a building.

The camera 10 should be placed at a known distance d and height t away from the target wall 80. The camera 10 should be oriented orthogonally relative to the target wall 80. The camera 10 should be aligned with roughly the center of the target 82. As shown in FIG. 11, the four targets 82 should appear as target images 84 on the display screen 56 of the display unit. A user then touches the touch screen 56 at each of the target images 84 in sequence. Based on the spacing of target images 84 on the touch screen 56 and upon the distance d of the camera 10 from the wall 80, as well as the known actual spacing of the targets 82, the camera 10 and display screen 56 can be calibrated such that the indicators correspond accurately with the geography shown on the display screen 56 when in use.

The ratio of the spacing of the target images 84 on the touch screen 56 to the actual distances between the targets 82 on the target wall 80 at a given distance d, can be used to create a transformation matrix that converts the actual GPS coordinates of the indicators into screen coordinates, so that the indicators accurately correspond with the geography shown on the display screen 56.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A device for guiding a vehicle through a field comprising:
   a camera for generating a video signal corresponding to a picture;
   a receiver for receiving a navigation satellite signal from a navigation satellite system, the navigation satellite signal representing a present position of the vehicle;
   a central processing unit (CPU) connected to the camera for receiving the video signal and connected to the receiver for receiving the navigation satellite signal, the CPU generating a master signal comprising the video signal, an actual position indicator signal representing the actual position of the vehicle, and a desired position indicator signal representing a desired position of the vehicle;
   a display connected to the CPU for receiving the master signal and generating a master image comprising a live picture-image, an actual position indicator image, and a desired position indicator image, whereby driving the vehicle to cause alignment of the actual position image with the desired position image causes the vehicle to be aligned with the desired position.

2. A device according to claim 1 wherein the live picture-image is superimposed over the entire master image.

3. A device according to claim 1 wherein the master image generated by the display comprises an actual line image in the place of an actual indicator image and a desired line-image in the place of a desired indicator image.

4. A device according to claim 1 wherein the master signal generated by the CPU comprises two separate indicator signals representing a path which the vehicle will take on the next pass, the display generating a master image further comprising two separate indicator images representing the path which the vehicle will take on the next pass.

5. The device according to claim 1 wherein the master signal generated by the CPU further comprises a shaded signal representing a worked area, the master image further comprising a shaded image representing the worked area.

6. The device according to claim 1 wherein the master signal comprises a lower end for each of the desired indicator signal and the actual indicator signal, the lower ends of both of the desired indicator signal and the actual indicator signal being fixed to one another.

7. The device according to claim 1, wherein the master signal comprises a row indicator image signal such that the master image includes a row indicator image within the live picture image to indicate a particular row for a next pass through a field of row crops.

8. A method for aligning a vehicle in the proper position on a pass through a field comprising:
   capturing a live picture with a video camera;
   sending a video signal of the live picture from the video camera to a central processing unit (CPU);
   receiving a navigational signal from a navigational satellite system, the navigational signal comprising data representing a present position of the vehicle;
   sending the navigational signal to the CPU;
   determining with the CPU where the vehicle is actually positioned and where the vehicle has already been within the field based upon the navigational signal;
   generating a master signal with the CPU comprising a live picture signal, an actual indicator signal representing an actual location of the vehicle within the field, and a desired indicator signal representing a desired location of the vehicle;
   communicating the master signal from the CPU to a display;
   displaying on the display a master image generated from the master signal comprising a live picture-image, a desired indicator image, and an actual indicator image on the display;
   driving the vehicle to cause alignment of the actual indicator image with the desired indicator image, whereby the vehicle comes into alignment with the desired location of the vehicle.

9. The method of claim 8 further comprising the step of displaying a desired line image in the place of a desired indicator image and an actual line image in the place of an actual image.

10. The method of claim 8 wherein:
the master image comprises a pair of spaced apart actual indicators which represent outer physical bounds of a work area through which the vehicle will pass and a shaded area which represents a worked area through which the vehicle has already passed; and
the vehicle driving step further comprises steering the vehicle to cause an alignment of one of the spaced apart actual indicators with the shaded area whereby the vehicle comes into alignment with the desired location of the vehicle.

11. The method of claim 8 wherein the master image includes a shaded area representing a worked area where the vehicle has already passed.

12. The method of claim 8 wherein the actual indicator and the desired indicator each include lower ends, the method including maintaining the lower end of the actual indicator fixed to the lower end of the desired indicator.

13. The method of claim 8, wherein the step of generating the master signal further comprises generating a row indicator image signal to indicate a particular row within the live picture image for a next pass through a field of row crops.

14. A method for aligning a vehicle in a desired position for a next pass through a field comprising:
capturing a live picture with a video camera;
sending data corresponding to the live picture from the video camera to a central processing unit (CPU);
receiving a navigational signal from a navigational satellite system, the navigational signal comprising data corresponding to a present position of the vehicle and corresponding to where the vehicle has already gone;
sending the navigational signal to the (CPU);
determining the present position of the vehicle and where the vehicle has already gone based on the navigational signal received by the CPU;
generating a master signal with the CPU comprising a live picture signal, an actual indicator signal representing the actual location of the vehicle, and a desired indicator signal representing the desired location of the vehicle;
communicating the master signal from the CPU to a display;
displaying a master image comprising a live picture-image, a pair of indicators representing an expected position for a next pass of the vehicle; and a desired indicator image;
driving the vehicle to cause the alignment of the pair of indicators representing the expected position for the the next pass of the vehicle with the desired indicator image, whereby the vehicle comes into alignment with a desired location of the vehicle.

15. The method of claim 14 wherein the step of generating the master signal further comprises generating an actual signal representing the next pass of the vehicle and a desired signal representing the desired location of the vehicle; the step of displaying further comprises displaying an actual indicator image corresponding to the actual signal and a desired indicator image corresponding to the desired signal; and the step of driving additionally comprising driving the vehicle to align the actual indicator image with the desired indicator image.

16. The method of claim 15 and further comprising using the central processing unit to generate a desired line signal representing where the vehicle will go in the next pass and an actual line signal representing the actual position of the vehicle; the step of displaying further comprising displaying an actual indicator line image representing the actual line signal and a desired line image representing the desired line signal; and the step of driving the vehicle to align the desired line image with the actual line image whereby the vehicle comes into alignment with the desired location of the vehicle.

17. The method of claim 14, wherein the step of generating the master signal further comprises generating a row indicator image signal to indicate a particular row within the live picture image for the next pass the field.

* * * * *

UNITED STATES PATENT AND TRADEMARK OFFICE
CERTIFICATE OF CORRECTION

PATENT NO. : 8,374,790 B2
APPLICATION NO. : 12/609662
DATED : February 12, 2013
INVENTOR(S) : Richard D. Gould et al.

Page 1 of 1

It is certified that error appears in the above-identified patent and that said Letters Patent is hereby corrected as shown below:

Col. 9, Claim 14, Line 34:
ADD after and --data--

Col. 10, Claim 14, Line 11:
DELETE after for "the"

Signed and Sealed this
Second Day of April, 2013

Teresa Stanek Rea
*Acting Director of the United States Patent and Trademark Office*